(12) United States Patent
Tanaka et al.

(10) Patent No.: US 7,008,456 B1
(45) Date of Patent: Mar. 7, 2006

(54) COMPUTER WITH SECURITY FUNCTION AND METHOD THEREFOR

(75) Inventors: Jun Tanaka, Zama (JP); Masahiko Nomura, Sagamihara (JP); Hideto Horikoshi, Sagamihara (JP); Hideyuki Usui, Chigasaki (JP); Seita Horikoshi, Zama (JP); Fumio Tamura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/488,653

(22) Filed: Jan. 20, 2000

(30) Foreign Application Priority Data

Jan. 21, 1999 (JP) ................................ 11-013215

(51) Int. Cl.
G06F 11/30 (2006.01)
G06F 12/14 (2006.01)
H04L 9/00 (2006.01)
H04L 9/32 (2006.01)

(52) U.S. Cl. ........................... 726/35; 726/27; 726/34; 726/36

(58) Field of Classification Search ................ 713/200
See application file for complete search history.

(56) References Cited

U.S. PATENT DOCUMENTS

| 5,629,981 | A | * | 5/1997 | Nerlikar | 713/168 |
| 5,682,299 | A | * | 10/1997 | Kunert | 361/816 |
| 5,748,084 | A | * | 5/1998 | Isikoff | 340/568.1 |
| 6,609,656 | B1 | * | 8/2003 | Elledge | 235/382 |

* cited by examiner

Primary Examiner—Gregory Morse
Assistant Examiner—Christopher J. Brown
(74) Attorney, Agent, or Firm—Louis Herzberg; Anne Vachon Dougherty

(57) ABSTRACT

A technique for prohibiting access to a computer having a security function when a security device is illegally removed from the computer. The security device is a hardware component that constitutes a part of a security function for a computer. When the security device is illegally removed from the computer, access to the computer is prohibited. Data indicating that the security device is attached to the computer are stored in a nonvolatile memory. Then, when a specific event, such as a power-ON event, is used as a trigger, the procedure for prohibiting the access to the computer is initiated. Following this, based on the data stored in the memory, it is detected that the security device was once attached to the computer and that it has now been removed. If currently the security device is not attached to the computer, although it was attached before, the access to the computer is prohibited.

8 Claims, 5 Drawing Sheets

COMPUTER WITH SECURITY FUNCTION AND METHOD THEREFOR

FIELD OF THE INVENTION

The present invention relates to a technique by which access to a computer can be denied following the illegal disconnection of a removably attached device, constituting a part of a security function for preventing theft and unauthorized accesses to the computer.

BACKGROUND OF THE INVENTION

While a notebook computer provides superior portability, it is also extremely susceptible to theft. Since recently the tendency is for users at the highest echelons in variety of fields to use computers, and since these users often store valuable information in their computers, most especially in notebook computers, when such a computer is stolen, divulgence of information resources can constitute a much more critical loss than does the loss of the physical resource.

In Japanese Unexamined Patent Publication Nos. Hei 8-50690 and Hei 10-124764, an electronic goods monitoring system is disclosed that uses a non-contact communication technique called an RF (Radio Frequency) transponder system. The RF transponder system generally comprises an Exciter/Reader (ER) and an RFID (Radio Frequency Identification) transponder or an RFID tag. The RFID tag is attached to a product in a monitored area, and the ER is deployed at a portal gate of the area, whereat it constantly generates an RF excitation signal. So that a power source is not required by the RFID tag itself, when the product to which the RFID tag attached is moved near the gate, the ER transmits an excitation signal that provides power for the RFID tag. Upon receiving the RF excitation signal, the RFID tag generates an identification code and other data signals, and, at a specific frequency, transmits them as a response signal to the ER. When the ER detects the identification code included in the response signal, it generates an alarm sound, as needed, to forestall the theft of the product. In order for the product to be removed from the monitored area without the alarm being sounded, the RFID tag must be set to the state whereat it does not transmit an alarm signal, or must be removed from the product.

In Japanese Unexamined Patent Publication No. Hei 5-35354, a technique is disclosed for forestalling theft of a notebook computer. In addition to other devices, the notebook computer comprises theft prevention means, for detecting changes in the installation condition, such as displacement, pressure and distance from an installation location; and means for generating an audible alarm, in accordance with changes in the installation condition. The computer constantly monitors the installation condition, and when, without permission, the computer is moved from a specific location, these means perform their prescribed functions, i.e., an alarm is sounded to prevent theft.

In Japanese Unexamined Patent Publication No. Hei 3-100894, a technique is disclosed whereby when a portable terminal is stolen, key entry is halted and unauthorized terminal accesses are prevented. When a portable terminal is stolen, a host computer transmits a specific radio signal to the terminal and, upon receiving this signal, the anti-theft program in the terminal is activated and key entry is disabled.

As described above, a technique is well known whereby an RFID tag is used to prevent theft of a product. Also well known are the techniques whereby a notebook computer is prevented from being illegally removed from a monitored area and whereby, when a computer is stolen, the keyboard is locked in order to protect information resources. However, no technique has been disclosed for attaching an RFID tag to a computer to prevent unauthorized accesses after the computer has been stolen.

A device, such as an RFID tag, must be provided for a computer in order to prevent theft or unauthorized accesses to stored information. Such devices, however, are not always required by users who purchase computers only for their personal use, as opposed to those users who are company employees and use their computers for company business. Therefore, it is preferable that the security function is not provided for all computers that are available on the market, because users who do not require such a function would have to pay extra for an unneeded capability. Therefore, for a specific computer series, one model must be produced that includes the security function and one model that does not.

To provide low prices and good maintenance services, it is preferable to increase utilization of the same hardware and the same software in both models when two models are produced for a specific computer series. When two models of computer in a specific series, only one having a security function, are manufactured and sold, it would seem that the costs to the users who do not need the security function would be fair. However, the costs are increased for those portions of the hardware and the software that can not be used in common, and as a result, the price is not advantageous for users who do not need the security function. As a result, there is an increased demand that solutions be found for problems concerned with the sharing of hardware and software in two models, and concerned with the fairness of the charges and expenses imposed on users, depending on whether or not a selected model is one that includes the security function.

To resolve these problems, it is preferable that there is a method whereby when a security function is implemented by a plurality of hardware and software components, some of those components are used in common, while the remaining components are optional ones that a dealer or a user can add later, as needed, to incorporate the security function. However, when a device (hereinafter this device is simply called a security device) that serves to implement a part of the security function is installed by a user or a dealer, that security device may be removed illegally, thus negating the security function.

It is, therefore, one object of the present invention to provide a technique by which access to a computer is proscribed when a device that serves as a part of the components required for a security function, i.e., a security device, is illegally removed from a computer. It is another object of the present invention to provide a computer system wherein only a security device is regarded as an optional device for a computer that includes a security function and one that does not, and wherein the other hardware and the software components used in common by the two computers are installed. It is an additional object of the present invention to provide a preferable structure for a security device that can be installed as an optional device by a user or at a dealer.

SUMMARY OF THE INVENTION

A computer according to the present invention includes a structure for optionally attaching a security device thereto. A computer with a security function is provided by attaching the security device thereto, and a computer without a security function is provided by removing the security device therefrom. According to the present invention, a procedure for prohibiting access to the computer can be initiated in association with a specific event, such as a power-ON state of the computer, alteration of a power saving mode or access to a specific file. The procedure may be initiated by periodic monitoring performed by a CPU using polling. When the procedure is initiated in association with a specific event, the load imposed on the CPU can be reduced.

According to a first aspect of the present invention, a method for prohibiting access to a computer after a security device has been removed from the computer comprises the steps of: (a) storing data indicating that the security device was attached to the computer in a first region of first storage means in the computer; (b) starting a procedure for prohibiting the access to the computer following the completion of the step (a); (c) using the data stored in the first region to detect that the security device was once attached to the computer; (d) detecting that the security device has been removed from the computer; and (e) prohibiting the access to the computer in response to the steps (c) and (d).

According to the present invention, the security device is a hardware device that is prepared as an optional device that serves as a part of the security function of the computer, and that can be easily attached and removed by a user or at a dealer. The security device may be an RF antenna used with an RFID for a security system or may be a fingerprint input unit for a security system for identifying fingerprints. The first storage means are a storage medium the contents of which can be retained even when the main power source of the computer has been halted; it can be an EEPROM or a hard disk. The first storage means may also be a RAM to which sufficient power to retain its contents is continuously supplied by a secondary battery, even when power from the main power source has been cut off. The above described procedure can be performed in common for both a computer that has a security function and a computer that does not. Access is denied only when a security device has been removed from a computer that included a security function.

According to the first aspect, at step (a) the system determines that the pertinent computer has a security function. When the security device is removed from the computer, it is concluded that an illegal act has occurred, and the following procedure is performed to prevent the computer from being accessed, until a password has been input. At step (b), a procedure for prohibiting access to the computer is initiated for both a computer that includes a security function and a computer that does not. At step (c), the pertinent computer is determined to be one that has a security function. At step (d) it is ascertained that the security device has been removed from the computer, and it is concluded that an illegal act has occurred. Therefore, at step (e) procedure is performed to prevent the computer from being accessed. In order to legally remove the security device from the computer and to ensure that continued access is possible, a password must be input.

According to a second aspect of the present invention, a method for prohibiting access to a computer after a security device has been removed from the computer, comprises the steps of: (a) storing data indicating that the security device was attached to the computer in a first region of first storage means in the computer; (b) starting a procedure for prohibiting the access to the computer following the completion of the step (a); (c) using the data stored in the first region to detect that the security device was once attached to the computer; (d) detecting that the security device has been removed from the computer; (e) storing, in response to the steps (c) and (d), data indicating that the security device that was once attached to the computer has been removed in a second region of the first storage means; and (f) prohibiting, in response to the step (e), the access to the computer.

According to the second aspect, at step (e), when the security device is attached to the computer and the system determines that this computer has a security function, and subsequently the security device is removed therefrom, data indicating that unauthorized access has taken place are stored in the second region of the first storage means. The data are retained in the second region unless the first storage means are reset.

According to a third aspect of the present invention, a method for prohibiting access to a computer after a security device has been removed from the computer, comprises the steps of: (a) storing data indicating that the security device that was once attached to the computer has been removed therefrom in a second region of first storage means in the computer; (b) starting a procedure for prohibiting the access to the computer following the completion of the step (a); (c) using the data stored in the second region to detect that the security device attached to the computer has been removed therefrom; and (d) prohibiting, in response to the step (c), the access to the computer.

At step (a) the data may be stored by using the method described in the second aspect of the present invention, and at step (c) the data are identified. Therefore, even if the security device is still attached when the procedure at step (b) is initiated, the security device will have been previously removed at least once, so that the access to the computer is prohibited.

According to a fourth aspect of the present invention, a method for prohibiting access to a computer after a security device has been removed from the computer, comprises the steps of: (a) storing data indicating that the security device was attached to the computer in a first region of first storage means in the computer; (b) permitting a central processing unit in the computer to monitor periodically to determine whether the security device has been removed from the computer; and (c) prohibiting the access to the computer in response to the step (b).

At step (b), the central processing unit monitors periodically to determine whether the security device has been removed from a computer that includes the security function. In this case, it is premised that the computer has been powered on, and when the security device is removed, the prohibition of the access to the computer can be effected by the periodical monitoring performed by the central processing unit.

The steps according to the first to the fourth aspects can be performed by a computer program. This program can be stored in nonvolatile memory, such as an EEPROM or a Flash ROM, that can be used as the second storage means, or on a hard disk or a floppy disk. When the computer is operated, the program can be loaded into the main memory and can be executed by the central processing unit.

Since the security device of the present invention is incorporated in a lid of the device bay, it can be provided as an optional device, without extra space in a computer being required. Either a lid in which the security device has been incorporated or a simple lid in which the security device has not been incorporated can be selected as the lid of the device bay and can be built in, and either lid can be installed in a computer by a user or at a dealer.

BRIEF DESCRIPTION OF THE DRAWINGS

The invention will now be described in greater detail with specific reference to the appended drawings wherein.

DETAILED DESCRIPTION OF THE INVENTION

Outline of Computer System

Figure 1:
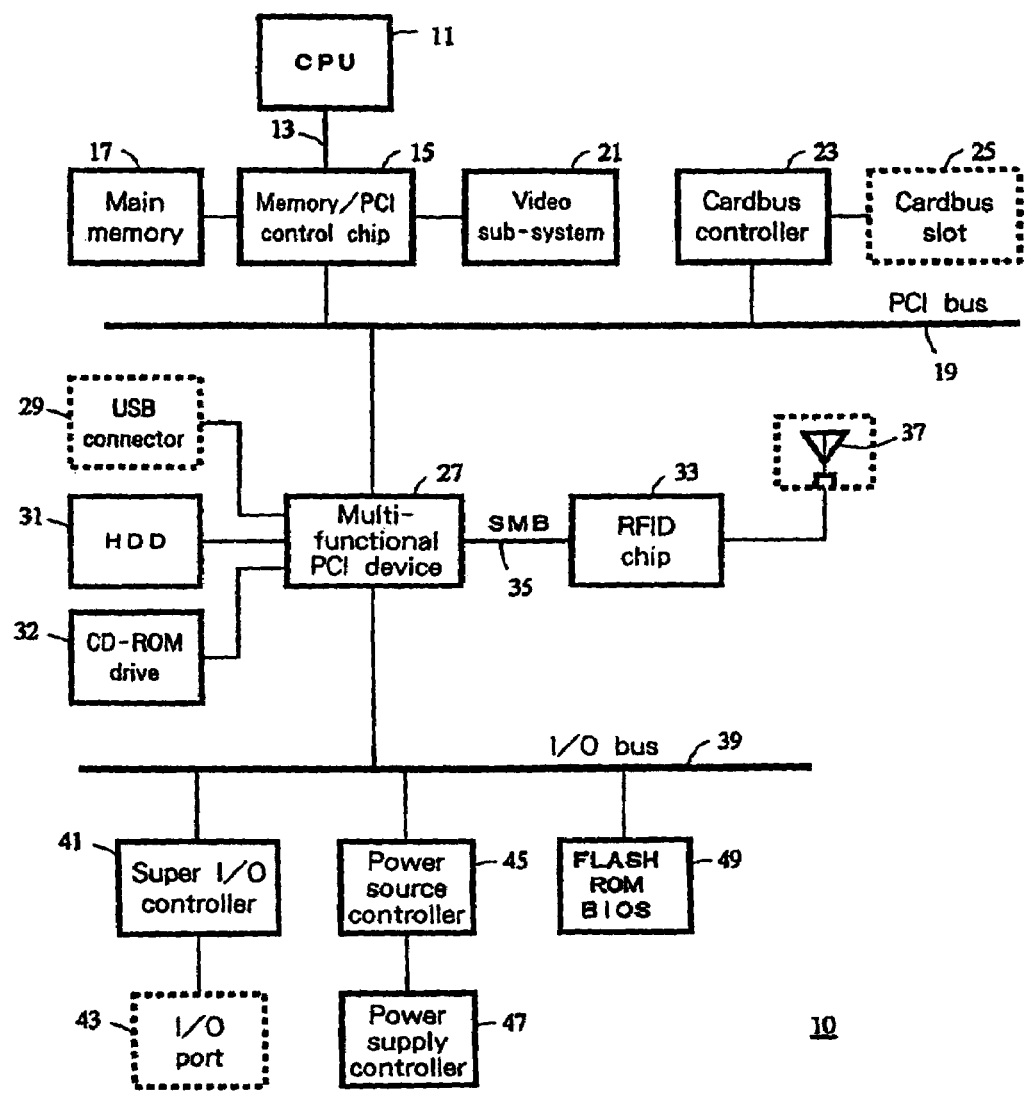
FIG. 1 is a schematic block diagram illustrating a computer according to the present invention.

FIG. 1 is a specific diagram illustrating the hardware arrangement for each sub-system in a personal notebook computer 10 according to the present invention. A CPU 11 executes various sub-programs under the control of an OS. The CPU 11 is connected via a system bus 13 to a bridge circuit (host-PCI bridge) generally called a memory/PCI control chip 15. The memory/PCI control chip 15 includes a memory controller for controlling access to a main memory 17, and a data buffer for absorbing the difference in the data transfer speeds provided by the system bus 13 and a PCI bus 19.

The main memory 17 is a writable memory as an area to be used by the CPU 11 for reading execution programs, or a work area in which to write data generated by execution of the program. The programs include an OS such as Windows98, various device drivers for operating peripheral hardware devices, an application program for a specific job, and a BIOS stored in a FLASH ROM 49. A video sub-system 21 is provided for implementing functions associated with the video. The video sub-system 21 includes a video controller for processing a drawing command received from the CPU 11, for temporarily writing the resultant drawing information into a video memory (VRAM), for reading the drawing information from the VRAM, and for outputting the drawing information as drawing data to a liquid crystal display (not shown).

A cardbus controller 23 is a dedicated controller for directly connecting the bus signal line of the PCI bus 19 to the interface connector (cardbus) of a PC card slot 25. The PCI bus 19 and an I/O bus 39 are interconnected by a multi-functional PCI device 27. The multi-functional PCI device 27 includes a bridge for the PCI bus 19 and the I/O bus 39, a DMA controller, a programmable interrupt controller (PIC), a programmable interval timer (PIT), an IDE (Integrated Drive Electronics) interface, a USB (Universal Serial Bus) and an SMB (System Management Bus) interface. A device PIIX4 provided by Intel, for example, can be used as the multi-functional PCI device. The IDE interface is connected to an IDE hard disk drive (HDD) 31, and to an IDE CD-ROM drive 32. Instead of the IDE CD-ROM 32, another type of IDE device, such as a DVD (a Digital Video Disc or a Digital Versatile Disc) drive, may be connected to the IDE interface. External storage devices, such as the HDD 31 and the CD-ROM drive 32, are mounted in an area called a "media bay" or a "device bay" in the main body of the system 10. These external storage devices may be so mounted in the system 10 that they can be replaced by other devices, such as an FDD or a battery pack.

An RFID chip 33 is connected to the multi-functional PCI device 27 and serves as an RFID tag. An RF antenna 37 is connected to the RFID chip 33. The RF antenna 37 is built into a lid of the device bay in the computer 10 in which the HDD 31 is mounted. A user who does not need the security function can select a lid of the device bay in which the RF antenna 37 is not incorporated. That is, the RF antenna 37 as a part of the security device is an optional component, and a user or a dealer can mount either the lid in which the RF antenna has been incorporated or the lid in which one has not been incorporated. The RFID chip 33 has a security function for receiving an RF excitation signal from the reader/writer through the RF antenna 37, and for preventing the computer 10 from illegal movement or illegal access to it. Each of these components performs a part of the security function of the computer 10. An outline of procedure performed will be given later.

An example ISA bus is the I/O bus 39, which is connected to a Super I/O controller 41, a power source controller 45 and a FLASH ROM 49. The Super I/O controller 41 is a peripheral controller for driving a floppy disk drive (FDD), for inputting/outputting parallel data via a parallel port (PIO) and for inputting/outputting serial data via a serial port (SIO). I/O port 43 is connected to the Super I/O controller 41. The power source controller 45 is a single-chip microcomputer used mainly for providing power management and thermal management for the system. As this microcomputer, an H8/300 chip available from Hitachi Ltd. can be used. The power source controller 45 includes an MPU, a RAM, a ROM and a timer, and a program and a reference table required for performing the power management and thermal management are stored in the ROM. A power supply controller 47 is connected to the power source controller 45. The power supply controller 47 includes a charger for charging a battery and a DC/DC converter for generating a constant voltage of 5 V or 3.3 V that is used by the computer 10. The supply of power is directly controlled by the power source controller 45.

The FLASH ROM 49 is a rewritable nonvolatile memory used to permanently store code (BIOS: Basic Input/Output System) for controlling the input/output operation of hardware components, such as a keyboard and a floppy disk drive (FDD) and firmware, such as a power on self test program (POST) executed when the power is turned on. Electrical circuits other than those shown in FIG. 1 are required to constitute the computer system 10, but as these circuits are well known to one having ordinary skill in the art and are not related to the subject of the present invention, no explanation for them will be given.

Security Function Using RFID

The RFID function is a function for reading information for ID from or writing it to an EEPROM by using an RF (Radio Frequency), i.e., by radio. While the RFID function enables the wireless communication of information, the primary feature of the RFID tag is that, when the reader/writer is located on one side and the RFID tag is located on the other side, the RFID tag does not require a power source in order to exchange information. When the reader/writer transmits an RF excitation signal to the RFID tag, the RFID tag is excited and generates sufficient power to write data, and also uses the power to return the data to the reader/writer. When the reading/writing function of the RFID tag is used, much information can be exchanged between the reader/writer and the computer to which no power is supplied. As a result, this function can be used for asset management.

Figure 2:
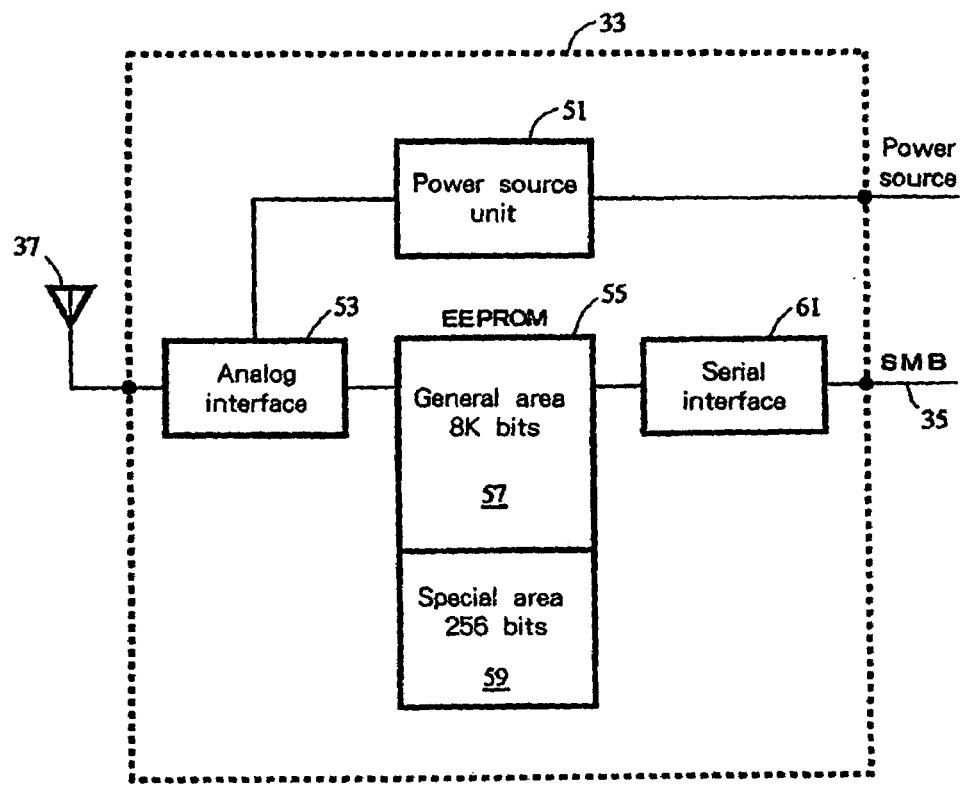
FIG. 2 is a schematic block diagram illustrating an RFID chip used for a first and a second embodiment of the present invention.

Another aspect of utilization for the RFID is related to the security function to the computer. FIG. 2 is a schematic diagram illustrating the internal structure of the RFID chip 33 that constitutes an RFID tag. The RFID chip 33 can be an AT24RF08 EEPROM (Asset Identification EEPROM) that is available from ATMEL. An EEPROM 55, which is included in the RFID chip 33, is divided into a general memory area 57 of 8K bits and a special memory area 59 of 256 bits. Data in the RF excitation signal received by the RF antenna 37 are written via an analog interface 53 in the general area 57. The data in the general area 57 are transmitted via the interface 53 and the RF antenna 37. The EEPROM 55 and the computer 10 communicate with each other via a serial interface 61 and an SMB 35, so that the computer 10 can read data from or write data into the general area 57 and the special area 59. The general area 57 has two memory regions according to the present invention. One region is an Antenna History bit indicating the history of installation of the RF antenna. When it is detected that the RF antenna is mounted on the computer 10, the Antenna History bit is set to "1." The other memory region is an Antenna Error bit. When it is detected that the RF antenna 37 has been removed from the computer 10, the Antenna Error bit is set to "1." The Antenna History bit and the Antenna Error bit can not be reset unless a user uses a correct password to access the EEPROM 55 from the computer system via the SMB 35 and the serial interface 61.

The special area 59 includes a DE/DC bit region, which is used to detect the state wherein the RF antenna 37 is mounted on or is removed from the computer 10; a Tamper bit region, which is set when the RF antenna 37 receives an RF excitation signal from a reader/writer located near the gate of a monitoring area; an Access Protection bit region, which is used to lock reading or writing relative to the general area 57; and a Sticky bit, which is used to lock changes of the Access Protection bit until the computer is powered off. The Access Protection bit region consists of two bits. When these bits are set to "00 or 01," access to the general area 57 is prohibited. When the Access Protection bits are set to "10," only reading is permitted, while when they are set to "11" writing and reading are permitted.

The DE/DC bit region consists of a DE bit (Detect Enable bit) and a DC bit (Detect Coil bit). When the DE bit is set to "1" via the serial interface 61, the RFID chip 33 examines the state of the RF antenna 37. When the RF antenna 37 is attached to the computer 10, "1" is written in the DC bit region. When the RF antenna 37 is removed from the computer 10, "0" is written in the DC bit region. When the power to the computer 10 is on, the power source unit 51 drives the analog interface 53, but when the power to the computer 10 is off, the RF excitation signal received at the RF antenna 37 drives the analog interface 53. Therefore, communication with the reader/writer is possible even though no power is being supplied.

Outline of Security Function for the First and Second Embodiments of the Present Invention An explanation will now be given for the outline of the security function of a computer according to the embodiments of the present invention. When a computer with its power off is brought near the gate of the monitoring area, the reader/writer transmits an RF excitation signal to the RF antenna 37, and a Tamper bit is set in the special area 59 of the EEPROM 55. Then when the computer is powered on, the BIOS stored in the Flash ROM 49 is written in the main memory 17, and the CPU 11 performs the POST program and initializes the system. But if the POST program detects that the Tamper bit has been set, the CPU 11 requests that a user enter his or her password, and halts the execution of the POST program. As a result, so long as a correct password is not entered, the computer can not be accessed.

As was previously described, an RF antenna 37 can be mounted on the computer by a user or at a dealer. Thus, an unauthorized person may remove the RF antenna 37 from the computer and pass the computer through the gate to avoid the setting of the Tamper bit. According to the embodiments, an RF antenna 37 is an optional component, and the other hardware components are used in common when an RF antenna 37 is mounted on the computer and when it has been removed therefrom. Furthermore, the same software (BIOS) can be used when an RF antenna 37 is mounted on the computer and when it has been removed therefrom. An explanation will now be given for the procedure performed to prohibit access to the computer when an RF antenna 37 has been illegally removed from the computer.

Procedure According to the First Embodiment of the Present Invention

Figure 3:
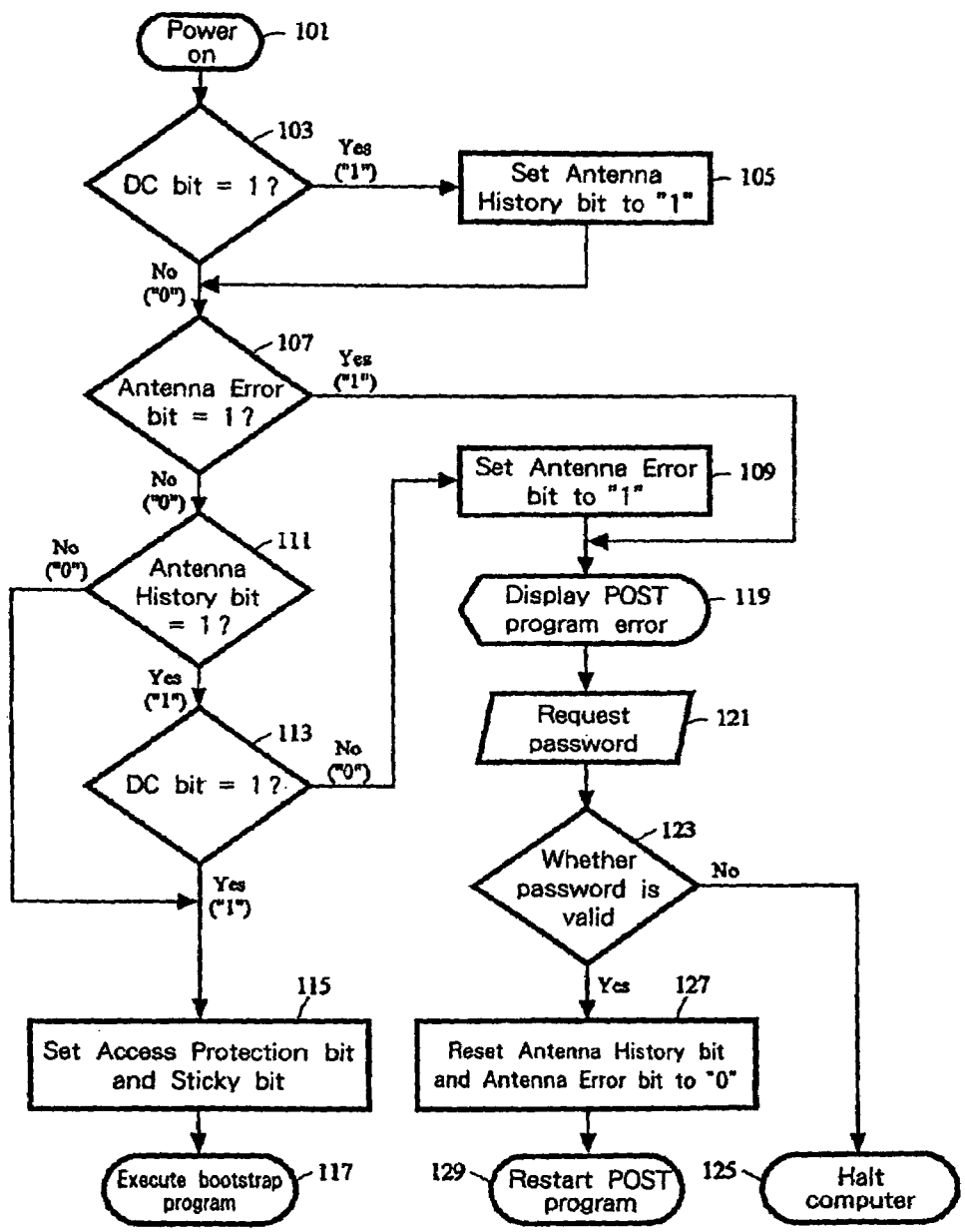
FIG. 3 is a flowchart showing a procedure performed for the first embodiment of the present invention.

FIG. 3 is a flowchart showing the procedure according to the first embodiment of the present invention. At this time, the system does not know whether an RF antenna 37 has actually been attached to the computer 10 to validate the security function. The Antenna History bit and the Antenna Error bit in the computer 10 are set to "0" when the computer is shipped from the factory. When at block 101 the computer 10 is powered on, the BIOS is read from the Flash ROM 49 to the main memory 17, and the CPU 11 reads the POST program and performs the following procedure. Since the Access Protection bit is set to "11" and the Sticky bit is always set to "1" in the RFID chip 33 when the power is switched on, the BIOS is permitted to access the general area 57. At block 103 the POST program sets the DE bit in the special area 59 to "1" in order to determine whether an RF antenna 37 is actually attached to the computer 10. In response to this, the RFID chip 33 examines attachment or removal of the RF antenna 37. When an RF antenna 37 is mounted on a computer 10, "1" is written in the DC bit, while when an RF antenna 37 is not mounted on the computer 10, "0" is written in the DC bit.

The POST program reads a DC bit when approximately 200 micro seconds has passed since the DE bit was set to "1," and then sets the DE bit to "0." When it is found that the DC bit is set to "1" and that an Rf antenna 37 is currently mounted on the computer 10, at block 105 the Antenna History bit in the general area 57 is set to "1." At this time, the system determines that the computer 10 is one that has the security function. Hereinafter, even when the computer 10 is powered off, this information is maintained in the Antenna History bit region unless a user possessing a valid password rewrites the bit. If it is found that the DC bit is set to "0" and an RF antenna is not mounted on the computer 10, at block 107 a confirmation process is performed for the Antenna Error bit in the general area 57. As will be described in detail at block 109, this process corresponds to the confirmation process to determine whether an RF antenna, that had been mounted on the computer before the preceding POST program was conducted, had been found to have been removed therefrom.

When at block 107 it is found that the Antenna Error bit is set to "1," it is concluded that an RF antenna 37 was mounted before the preceding POST program was conducted, and that at the time of execution of the preceding POST program it had been removed. It is therefore concluded that the RF antenna was removed illegally, and program control moves to block 119. Thereinafter, even when the computer 10 is powered off, this information is held in the Antenna Error bit region unless a user possessing a valid password rewrites the bit. When at block 107 it is found that the Antenna Error bit is set to "0," it is concluded that at least by the time the preceding POST program was conducted the illegal removal of the RF antenna 37 had not occurred and program control moves to block 111.

At block 111 the Antenna History bit is examined. That is, a check is performed to determine whether an RF antenna 37 was mounted on the computer 10 prior to the time at which the execution of the current POST program began. At the execution time for the current POST program at block 105, or at the execution time for the preceding POST program, the data are written in the Antenna History bit region. When at block 111 it is found that the Antenna History bit is set to "0," it is concluded that up to then an RF antenna was not attached to the computer 10 and that the pertinent computer does not include the security function. Program control then moves to block 115. When at block 111 it is found that the Antenna History bit is set to "1," it is concluded that an RF antenna 37 was attached to the computer 10 sometime before the execution of the current POST program began, and through the execution of the POST program it is detected that the RF antenna, which was mounted before the execution of the preceding POST program, has not been removed from the computer (Antenna Error bit=0). Program control then moves to block 113.

At block 113, the DC bit is reconfirmed to determine whether the RF antenna 37 was attached to or removed from the computer 10 at the time the current POST program is executed. When it is found that the DC bit is set to "1," i.e., when an RF antenna 37 has actually been attached to the computer 10, it is concluded that the security device has not removed and program control goes to block 115. When it is found that the DC bit is set to "0," it is concluded that an RF antenna was mounted on the computer sometime before execution of the current POST program began (block 111), but that it had been removed therefrom at the time the current POST program execution began (block 113). It is further concluded that the RF antenna was mounted before the execution of the preceding POST program and that its removal was not detected at the time of execution of the preceding POST program (block 107). Thereafter, program control moves to block 109. In other words, a case is processed by the current POST program wherein the RF antenna was removed during a period following the execution of the preceding POST program and continuing up to the execution of the current POST program. If the RF antenna 37 that was mounted was removed from the computer at the time of execution of the preceding POST program, the Antenna Error bit would have been found to be set to "1" when the current POST program was executed, and program control would have moved from block 107 to block 119.

The process at block 115 is performed for a computer that does not include the security function represented by the procedure at block 111, and for a computer that includes the security function represented by the procedure at block 113 but from which an RF antenna 37 has never removed since it was mounted. Since the security device has not removed in either of these cases, the Access Protection bit region is set to "10" and writing to the Antenna History bit and the Antenna Error bit in the general area 57 is prohibited. Further, the Sticky bit is set to "0" to prevent any change to the Access Protection bit until the computer has been powered off. This is done because the Access Protection bit is prevented from being changed to "11" via the OS, and the rewriting of the Antenna History bit and the Antenna Error bit is prevented. As a result, the rewriting of the Antenna History bit and the Antenna Error bit is enabled only during the period extending from block 101 to block 115, during which time the computer is in the power-ON state. Actually, only the POST program can rewrite the bits during this period. Program control then moves to block 117 where the BIOS bootstrap is executed and the OS and an application program are loaded into the main memory 17 to set up the computer.

At block 109 the Antenna Error bit is rewritten and set to "1." Each time the POST program is executed, the Antenna Error bit is set to "1" in accordance with the results examined at block 107 or at block 113. At block 109 a case is processed wherein the Antenna Error bit was not set to "1" when the preceding POST program was terminated (block 107), but wherein an RF antenna 37, which had been mounted in the past (block 111), had been removed by the time the current execution of the POST program began (block 113).

Program control then moves from block 109 to block 119. Program control also moves to block 119 when it is found at block 107 that the Antenna Error bit was already set to "1." At block 119 a POST program error is displayed by the computer 10 because at block 109 the Antenna Error bit was set to "1" during the execution of the current POST program, or because the Antenna Error bit was set to "1" before the preceding POST program was completed.

At block 121 a message requesting that a user enter a password is displayed. When at block 123 the BIOS determines that a valid password has been entered, at block 127 the Antenna History bit and the Antenna Error bit are reset to "0." Following this, at block 129 the POST program is restarted. During the restarted POST program, the procedure from block 101 to block 117 is cleared and the bootstrap program is executed, without a POST program error being displayed.

When at block 123 the BIOS determines that a valid password has not been entered, the POST program is halted and access to the computer is prohibited. If, thereinafter, a valid password is available, the procedure to power on the computer is started at block 101, a correct password is entered at block 121, and the bootstrap program is performed again at block 129.

Procedure for the Second Embodiment of the Present Invention

Figure 4:
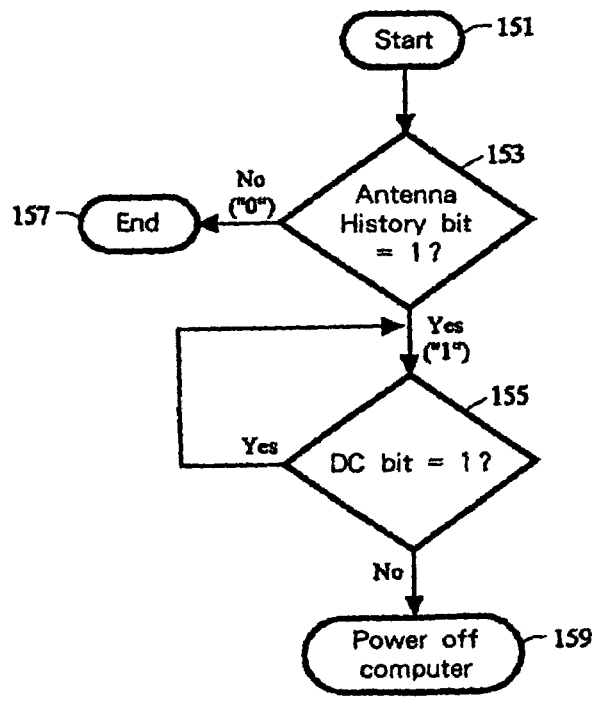
FIG. 4 is a flowchart showing a procedure performed for the second embodiment of the present invention.

In the procedure described by the flowchart in FIG. 3, when an RF antenna is illegally removed from a computer that is in the power-ON state and the computer is carried away, access to the computer can not be prohibited unless the power is turned off and the POST program is executed. In order to prevent the removal of an RF antenna while the power is on, according to the second embodiment of the present invention the procedure shown in the flowchart in FIG. 4 is performed. When the power is turned on, the POST program is performed in a manner described in FIG. 3 and the bootstrap program is initiated, and then at block 151 the procedure of the second embodiment is begun by a device driver. At block 153 the Antenna History bit is examined. If an RF antenna 37 was attached to the computer when the current POST program was executed, at block 105 in FIG. 3 the Antenna History bit was set to "1." Then, when at block 153 it is found that the Antenna History bit is set to "0" and no RF antenna is mounted on the computer, program control moves to block 157 and the procedure is terminated.

When at block 153 it is found that the Antenna History bit is set to "1" and an RF antenna 37 was mounted on the computer at the time when the current POST program was executed, program control moves to block 155, whereat the state of the DC bit is periodically examined by polling. It is preferable that a timer interrupt is used when performing polling in order not to interfere with the execution of other program. As long as the RF antenna 37 is not removed, the CPU 11 periodically monitors its state, but when the RF antenna 37 is removed from the computer, program control moves to block 159, whereat the computer is forcibly powered off. As a result, when a user again powers on the computer, the POST program in FIG. 3 is restarted. After being processed through the block in the procedure in FIG. 3 103, 107, 111, 113, 109, 119 and 121, a password is requested. That is, when the RF antenna 37, which was mounted, is removed while the computer is in the power-ON state, the computer is powered off in accordance with the timing of polling performed by the CPU 11. Then, when the computer is powered on again, the POST program is executed and a user who does not possess a valid password will not be able to access the computer.

An explanation has been given for a case wherein the procedure of the present invention is performed by the POST program in the BIOS. But the program executed to perform the present invention is not limited to the POST program, but can be another BIOS, a device driver, an OS or a software application. When software other than the POST program is used, the procedure in FIG. 3 can be initiated in response to access to specific data by a user or in response to shift of operation mode to a power saving mode, such as a suspend mode or a hibernation mode.

Figure 5:
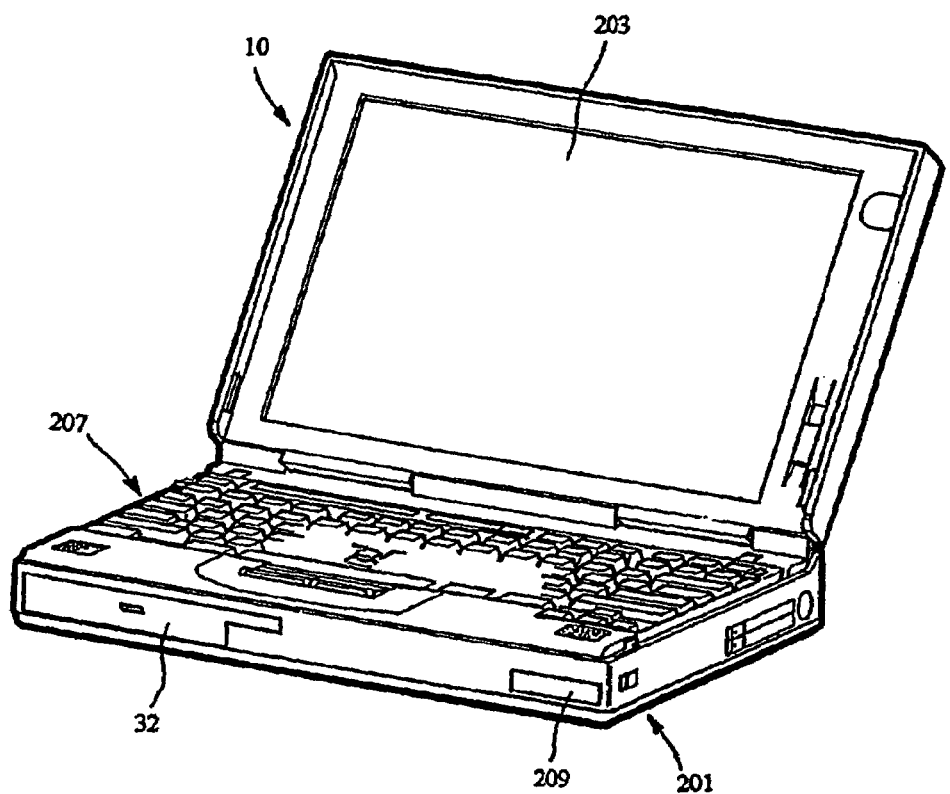
FIG. 5 is a diagram showing the external appearance of a computer according to the present invention.

FIG. 5 is a diagram illustrating the external appearance of an example computer 10 according to the present invention. The computer 10 comprises a main body 201, in which the components shown in FIG. 1 are mounted; a liquid crystal display 203; a keyboard 207, which is positioned on top of the main body 201; and a lid 209 of a device bay in which the CD-ROM drive 32 and the HDD 31 are mounted. The computer 10 has no special external features that are associated with the first and the second embodiments, except for the lid 209 of the device bay.

Figure 6:
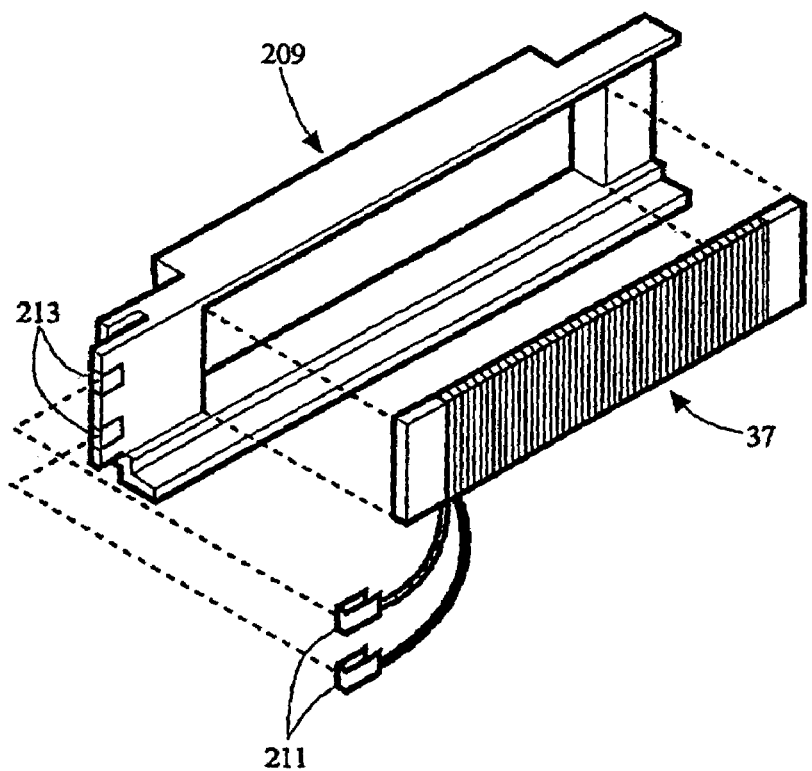
FIG. 6 is a diagram showing an example method for attaching an RF antenna used for the first and the second embodiments.

FIG. 6 is a diagram showing a method for attaching the RF antenna 37 used for the present invention. The RF antenna 37 is attached to the lid 209 of the device bay, and then the HDD 31 is removably mounted in the device bay and the lid 209 is fitted into the main body 201. For a computer for which an RF antenna 37 is not needed, i.e., one that does not require the security function, no RF antenna 37 is attached to the lid 209 and only the lid 209 is mounted in the main body 201. Another lid, differing from the lid 209, may be prepared to which an RF antenna 37 can not be attached. Since the lid 209 is so designed that an RF antenna 37 can be attached thereto, an RF antenna 37 can be mounted either by a user or at a dealer, and a user can select either a lid 209 with an RF antenna 37 or a lid 209 without one, in accordance with whether or not the security function is required. An RF coil antenna 37 is mounted inside the lid 209, and its lead wire 211 are connected electrically to the terminals 213 on the lid 209 and to the RFID chip 33.

Using this method, the RF antenna 37 can be attached not only to the lid of the HDD device bay, but also to the lid of a device bay for an external device, such as a CD-ROM drive, a DVD drive, an FDD, or a battery, or to the lid of a multi-bay in which these components are selectively stored. It is preferable that an assembly including an RF antenna 37 is so firmly mounted on the main body 201 that an unauthorized person can not easily and quickly remove the RF antenna 37 from the computer at a location whereat it is in use, and that a certain period of time is required for the attachment or the removal of an RF antenna at a dealer or by a user. In addition to a closely fitting structure, an attachment structure for which screws are used, or one for which screws are used that require a special tool, can be employed.

In the above embodiments, access to the computer is prohibited when the security device used with the RFID is removed. The scope of the present invention is, however, not limited to the RFID, but can also be applied for another type of security device which is employed to confirm the right to access a computer.

According to the present invention, a computer can be provided for which access is prohibited when a security device is illegally removed therefrom. Furthermore, a computer that includes a security function and a computer that does not can be provided by using the same hardware and software, except for the security device. Further, a computer can be provided that has an attachment structure for a security device that can be attached and removed and that does not require extra space.

Having thus described the invention, what is claimed is:

1. A method for prohibiting access to a computer, having a radio frequency identification (RFID) chip and capable of having a removable radio frequency (RF) antenna security device installed therein, after a radio frequency antenna security device has been removed from said computer, comprising the steps of:
   (a) storing data comprising at least an antenna history, antenna error, detect coil, detect enable, tamper and access protection bit regions indicating that said security device was originally attached to said computer in a first region of first storage means at said RF chip in said computer, wherein said first storage means is capable of storing data received from said RF antenna while a main power source of said computer is turned off;
   (b) starting a procedure for prohibiting the access to change said stored data at said computer following the completion of said step (a);
   (c) using said data stored in said first region to verify that said security device was once attached to said computer by accessing at least said antenna history bit;
   (d) dynamically determining that said security device is no longer attached to said computer; and
   (e) prohibiting the access to said computer in response to said steps (c) and (d).

2. The method according to claim 1, wherein said step (b) is initiated in response to a trigger event.

3. The method according to claim 1, wherein said step (e) is performed only when an authorized password is not entered.

4. The method according to claim 3, further comprising the step of:

storing, in response to receipt of an authorized password, data indicating that said security device that was once attached to said computer has been removed in a second region of said first storage means.

5. A computer, having a radio frequency identification (RFID) chip, capable of having a removable radio frequency (RF) antenna security device installed therein, comprising:

first storage means at said RFID chip capable of storing data received from said RF antenna while a main power source of said computer is turned off;

a central processing unit;

means for storing data comprising at least antenna history, antenna error, detect coil, detect enable, tamper and access protection bit regions indicating that said security device that was once attached to said computer has been removed therefrom in a region of the first storage means;

detection means for using data stored in said region to detect that said security device attached to said computer has been removed therefrom; and means for prohibiting, in response to said detection mean, access to said computer.

6. The computer according to claim 5 further comprising means for determining it removal of said security device was authorized means for storing, in response to said determination data indicating that said security device that was once attached to said computer has been legitimately removed therefrom in a second region of said first storage means.

7. The computer according to claim 5, wherein said RF antenna is attached to a lid of a device bay of said computer.

8. The method according to claim 1 wherein said storing is done in response to receipt of an RF excitation signal received from a remote RF transmitter.

* * * * *